United States Patent [19]

Phillips

[11] Patent Number: 5,496,413
[45] Date of Patent: Mar. 5, 1996

[54] VEHICLE CLEANING & WAXING PREPARATION AND METHOD OF USE

[76] Inventor: Brian Phillips, 3022 Blue Field, San Antonio, Tex. 78230

[21] Appl. No.: 206,740

[22] Filed: Mar. 7, 1994

[51] Int. Cl.⁶ .................................................. B08B 3/08
[52] U.S. Cl. ........................................ 134/7; 134/42
[58] Field of Search ............... 134/6, 7, 42; 252/108, 252/174.15, 173, 135, 544

[56] References Cited

U.S. PATENT DOCUMENTS

| | | | |
|---|---|---|---|
| 4,005,030 | 1/1977 | Heckert et al. | 252/174.15 |
| 4,565,644 | 1/1986 | Smith et al. | 252/92 |
| 4,665,116 | 5/1987 | Kornhaber et al. | 524/268 |
| 4,675,125 | 6/1987 | Sturwold | 252/118 |
| 4,952,248 | 8/1990 | Aberg | 134/40 |
| 4,992,196 | 2/1991 | Joubert et al. | 252/174.15 |
| 5,316,692 | 5/1994 | John | 252/174.15 |

FOREIGN PATENT DOCUMENTS

| | | |
|---|---|---|
| 792647 | 4/1958 | United Kingdom . |
| 873230 | 7/1961 | United Kingdom . |

*Primary Examiner*—Zeinab El-Arin

[57] ABSTRACT

A method of cleaning and waxing of an aircraft's (or other vehicle's) exterior surfaces through a single application of a composition and use of simple wiping cloths. The composition is applied by spray bottle, agitated with a first cloth (or portion thereof), and wiped from the surface with a second cloth (or portion thereof). This process will both clean and provide a waxed finish to any smooth, polished vehicular surface.

2 Claims, No Drawings

VEHICLE CLEANING & WAXING PREPARATION AND METHOD OF USE

BACKGROUND OF THE INVENTION

1. Field of The Invention

Applicant's invention relates to preparations useful in cleaning and waxing vehicles with smooth exterior surfaces, such as airplanes, automobiles and marine craft.

2. Background Information

While Applicant's cleaning and waxing preparation as described below has considerable utility with any vehicle having a smooth exterior surface, such as airplanes, automobiles, and boats, the benefits provided by Applicant's invention will likely be most appreciated, and contribute most significantly to segments of our economy which rely on aircraft.

Aircraft must be routinely cleaned to remove accumulated dirt, soot, and other pollutants gathered on skin surfaces during operation. Allowing debris to accumulate adversely affects economy of operation. Contaminants on a aircraft's skin creates an uneven surface over which air flows more turbulently, thus requiring greater force (and fuel) to propel the aircraft at desired air speed. The significance of this effect is evidenced by a recent United Parcel Service television commercial in which the company touted its more frequently that normal plane washing schedule for its resulting savings of millions of gallons of fuel each year. Particularly in the commercial realm, dirty aircraft also present an aesthetics and public image problem.

A serious problem faces the airline and aircraft maintenance industries in connection with their cleaning operations. The problem arises from the heretofore incompatible needs to minimize pollution of ground surfaces and ground water from the resulting mixtures of removed contaminants and cleaning solutions.

This problem is real, and not simply the product of theory, or of environmental idealism. Airlines have spent millions of dollars constructing wash racks for their airplanes, only to find that they produce too much contaminant run-off to be permitted to operate. The Environmental Protection Agency (EPA) has actually suspended operation of some such wash racks for this reason, at substantial cost to the owners.

Even if modifications to large, commercial airliner sized wash racks are eventually achieved to adequately address the toxic run-off problems, the problems remain in association with cleaning aircraft of non-major carriers, such as those of smaller, commuter airlines and private planes. These planes must be cleaned, but in most cases will not likely have access to the wash racks which may have been modified to meet EPA standards, and certainly cannot afford to construct their own acceptable wash racks. Hand washing of a plane, much in the manner of washing a car in one's front yard, will likely result in EPA fines. In any event, hand washing cannot take place on the tarmac, but rather requires removal to a service area. This, in turn, means that, if hand washing is the only option for cleaning a plane, it will not occur nearly as frequently as if some process were available to quickly and inexpensively clean the aircraft, such as during short stops along a flight route.

New solutions for cleaning aircraft are clearly needed. Ideal would be any preparation and attendant process which permits quick and inexpensive cleaning of an aircraft and produces a clean and waxed surface.

SUMMARY OF THE INVENTION

It is an object of the present invention to provide a novel preparation useful in both cleaning soiled vehicular surfaces and applying a wax finish.

It is another object of the present invention to provide a cleaning and waxing preparation which, in one application, enables both cleaning and waxing of painted or polished vehicular surfaces.

It is another object of the present invention to provide a method for cleaning and waxing exterior vehicular surfaces which method can be accomplished without machinery, without water supplies, and with application of only a single cleaning/waxing preparation.

It is another object of the present invention to provide a method for cleaning and waxing exterior aircraft surfaces which method does not produce environmentally hazardous run-off.

It is another object of the present invention to provide a method for cleaning and waxing exterior aircraft surfaces which method is sufficiently simple and quick as to allow cleaning on a flight line and during only short airport stops.

In satisfaction of these and related objectives, Applicant's present invention provides a novel and unobvious chemical composition and associated method of use which permits cleaning and waxing of an aircraft's (or other vehicle's) exterior surfaces through a single application of the composition and use of simple wiping cloths. By merely applying and wiping off Applicant's preparation, a user will both clean and provide a waxed finish to any smooth, polished surface. Applicant's preparation includes no petroleum products, and the use thereof involves no run-off to contaminate ground surfaces or ground water. Applicant's preparation and associated method provide unique and highly beneficial utility in aircraft related industries where the speed and simplicity of cleaning aircraft using Applicant's preparation and methods will permit much more frequent cleanings, all without having to move the aircraft to a remote washing facility with the attendant loss of aircraft availability. Applicant's preparation and method provide means by which aircraft (and other vehicles) can be cleaned without any realistic risk of violating applicable environmental regulations, so long as the soiled cloths are disposed properly.

This more frequent cleaning will favorably impact the economies of operation for any aircraft owner through fuel economy which attends the consistent maintenance of clean surfaces on any aircraft.

DETAILED DESCRIPTION OF THE PREFERRED EMBODIMENT

The composition of Applicant's invention is, at the most basic level, a mixture of cleaning agents and waxing agents. However, the particular formulation of Applicant's composition is the result of protracted experimentation, testing and reformulations. Only when Applicant arrived at the formulation herein disclosed, did he discover a single composition which: (1) loosened even the most difficult contaminants from vehicular surfaces (bugs on leading aircraft wing edges for example) sufficiently for simply wiping from the surface clean using a common cleaning cloth; (2) left no cloudy residue; (3) contained no petroleum products or other harmful vapor producing agents; (4) left a highly durable wax finish after wiping excess away with cloths; and (5) was suitable for application using simple hand actuated spray bottles.

The cleaning agent portion of Applicant's composition comprising the following ingredients in the relative amounts as indicated:

| Sodium Tripolyphosphate | 20 lbs. |
| Triethanolamine | 5 lbs. |
| Phosphate ester | 4.5 lbs. |
| Hexylene Glycol | 44 lbs. |
| 2-1 Modified Coconut Diethanolamide | 343 lbs. |

The waxing component of Applicant's composition comprising the following ingredients in the relative amounts as indicated:

| Dow 346 | 56 lbs. |
| Water | 345 lbs. |

"Dow 346" is a Silicone Emulsion available from the Dow Corning Corporation. It is described by Dow as a polydimethylsiloxane emulsion with added water. Dow's 346 Emulsion has been used as polish ingredients before, but nothing in the prior art known to Applicant teaches combining the emulsion with a soap component to achieve a wash and wax preparation, particularly as useful for vehicular cleaning such as cleaning of aircraft.

Two differing formulae for Applicant's composition varying as to the relevant components of cleaning component and waxing component have proven optimal for two primary types of use. A light cleaning version is formulated as follows in the preferred embodiment:

| Cleaning component | 1.0 gal. |
| Wax Component | 5.0 gal. |
| Water | 49 gal. |
| Dye (optional) | 2 Tsp. |
| Scent (optional) | 7 Oz. |

This formulation is useful for cleaning lightly soiled portions of a plane or other vehicle.

A heavy cleaning version of Applicant's composition is formulated as follows:

| Cleaning component | 27.5 gal. |
| Sodium Xylene Sulfonate | 7.0 gal. |
| Wax Component | 5.0 gal. |
| Water | 15.5 gal. |
| Dye (optional) | 2 Tsp. |
| Scent (optional) | 7 Oz. |

This formulation is for much more heavily soiled areas, such as (in the case of aircraft) in or near engine areas, belly surfaces, gear and flap areas.

The preferred mode for using Applicant's composition is straight forward: (1) spray a ½ to 2 square yard surface area; (2) agitate area with damp cleaning cloth; (3) wipe away with dry cleaning cloth before the composition dries on the surface. Repeat the process until the vehicle is clean. Simple arc-like wiping motions perform best, and linear or circular motions are both unnecessary, but also more time and energy consuming.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A method for cleaning and waxing exterior surfaces of an aircraft through application of a single composition said method consisting of the steps of:

selecting a cleaning and waxing preparation, said cleaning and waxing preparation "consisting essentially of: sodium tripolyphosphate; triethanolamines; phosphate ester; hexylene glycol; diethanolamide; water and" a polydimethylsiloxane emulsion;

applying a first measure of said preparation to a first surface area of said aircraft which is to be cleaned;

agitating said first measure of said preparation on said first surface area using a first cleaning cloth portion; and removing substantially all of said first measure from said first area using a second cleaning cloth portion before said first measure dries on said first surface area.

2. The method of claim 1 wherein said cleaning and waxing preparation consists essentially of:

Sodium Tripolyphosphate; Triethanolamine; Phosphate ester; Hexylene Glycol; 2-1 Modified Coconut Diethanolamide; water; and a polydimethylsiloxane emulsion.

* * * * *